United States Patent
Leonardi et al.

(10) Patent No.: US 12,362,607 B2
(45) Date of Patent: Jul. 15, 2025

(54) STATOR WITH SERPENTINE COOLANT PATH ON THE OUTER SURFACE

(71) Applicant: Ford Global Technologies, LLC, Dearborn, MI (US)

(72) Inventors: Franco Leonardi, Dearborn Heights, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 447 days.

(21) Appl. No.: 17/576,584

(22) Filed: Jan. 14, 2022

(65) Prior Publication Data

US 2023/0231427 A1   Jul. 20, 2023

(51) Int. Cl.
  *H02K 1/20* (2006.01)
  *H02K 7/00* (2006.01)
  *H02K 9/19* (2006.01)

(52) U.S. Cl.
  CPC .............. *H02K 1/20* (2013.01); *H02K 7/006* (2013.01); *H02K 9/19* (2013.01)

(58) Field of Classification Search
  CPC ............ H02K 1/20; H02K 9/19; H02K 9/193; H02K 9/197; H02K 9/20
  USPC ........................................................ 310/58
  See application file for complete search history.

(56) References Cited

U.S. PATENT DOCUMENTS

| 6,300,693 | B1 | 10/2001 | Poag et al. | |
|---|---|---|---|---|
| 10,097,066 | B2 * | 10/2018 | Hanumalagutti et al. | H02K 1/20 310/54 |
| 10,886,814 | B2 * | 1/2021 | Liu et al. | H02K 1/12 310/54 |
| 2020/0106327 | A1 * | 4/2020 | Iglesias et al. | H02K 1/20 310/62 |
| 2020/0227977 | A1 * | 7/2020 | Bradfield | H02K 1/20 310/59 |

(Continued)

FOREIGN PATENT DOCUMENTS

EP       2806535 A1 * 11/2014 ............. H02K 1/185

OTHER PUBLICATIONS

EP-2806535-A1 translation (Year: 2014).*

(Continued)

*Primary Examiner* — Thomas Truong
(74) *Attorney, Agent, or Firm* — David B. Kelley; Brooks Kushman P.C.

(57) ABSTRACT

An electric machine for an electrified vehicle includes a stator core configured to receive a plurality of windings. The stator core including a plurality of interchangeable stacked laminations arranged in sub-stacks. The sub-stacks having an outer diameter surface divided into circumferential quadrants, each quadrant having a cutout extending inwardly at a predetermined depth and radial position to define a serpentine cooling path on the outer surface of at least a portion of the sub-stacks. The sub-stacks are circumferentially rotated relative to each other such that two quadrants have a first cutout orientation, and the two other quadrants have a second cutout orientation, the first cutout orientation is different than the second cutout orientation and when rotated in sequence each cutout aligns to form the continuous serpentine cooling path in a quadrant of the stator core.

14 Claims, 6 Drawing Sheets

(56) References Cited

U.S. PATENT DOCUMENTS

2020/0389064 A1* 12/2020 Leong et al. ............ H02K 9/19
310/54

OTHER PUBLICATIONS

J. Herbst et al., "Challenges in the Design of a 100 kW Induction Motor for a PHEV Application", University of Texas Center for Electromechanics, Austin, Texas, 6 pgs.

* cited by examiner

STATOR WITH SERPENTINE COOLANT PATH ON THE OUTER SURFACE

TECHNICAL FIELD

The present disclosure relates to a stator cooling path, for use with an electric machine of electric and hybrid-electric vehicles.

BACKGROUND

Extended drive range technology for electrified vehicles, such as battery electric vehicles ("BEVs") and plug in hybrid vehicles ("PHEVs"), continually increases demands on electric machines used for vehicle propulsion and power generation. Specifically, achieving increased driving ranges may require traction batteries and electric machines to have higher power outputs and associated thermal management systems with more efficient and increased cooling capacities relative to previous BEVs and PHEVs to prevent overheating.

Electric machines typically include a stator and a rotor that cooperate to convert electrical energy into mechanical motion or vice versa. Electric machines require the thermal management systems to cool the stator, rotor or both.

SUMMARY

An electric machine for an electrified vehicle including a stator core having a plurality of sub-stack laminations. Each sub-stack lamination includes an outer diameter surface with four circumferential quadrants. Each quadrant includes a cutout defining a serpentine cooling channel and the two quadrants have a first cutout orientation, and the two other quadrants have a second cutout orientation, the first cutout orientation is different than the second cutout orientation. At least one winding is supported on the stator core.

An electric machine including a stator core. The stator core including at least four sub-stack lamination sets, each sub-stack having an outer diameter surface including four circumferential quadrants extending axially and spaced apart by a mounting tab. Each quadrant includes a cutout defining a serpentine cooling channel extending through a thickness of the lamination sets. Each set is configured to rotate at least 90 degrees about a central axis to maintain a continuous cooling path through the serpentine cooling channel.

Assembling a stator core by forming laminations each lamination having a plurality circumferentially extending grooves cut into an outer surface of the lamination. The laminations may then be arranged into sets of at least four laminations. The laminations are then stacked such that each lamination is circumferentially rotated relative to neighboring ones of the laminations so that the asymmetric circumferentially extending grooves create a continuous serpentine cooling channel flow path. Then the laminations are joined to form the stator core.

DETAILED DESCRIPTION

Designs of the present disclosure are described herein. It is to be understood, however, that the disclosed designs are merely examples and other elements may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce designs that are not explicitly illustrated or described. The combinations of features illustrated provide representative designs for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces face away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

An electric machine may include a thermal management assembly that introduces an oil or other dielectric fluid to portions of the electric machine for cooling purposes. In some examples, the oil may be dripped or sprayed onto wire end windings of the electric machine. However, non-uniformity of coolant flow as applied to the end windings may reduce cooling efficacy at the end windings and a cooling jacket may be required to provide additional cooling.

According aspects of the present disclosure, an electric machine includes an integrated thermal management system having cutouts that are uniquely shaped in each quarter of the stator laminations to form a serpentine cooling channel to circulate coolant between the stator out surface and the inner surface of the housing. According to other aspects of the present disclosure, the electric machine includes a stator having a plurality of stacked laminations, the laminations including a plurality of serpentine cooling channels configured in each quarter of the lamination stack that can be rotated to maintain each distinct cooling path in each distinct quarter. According to further aspects of the present disclosure, a method of assembling a stator stack where the channels align based on the specific stack rotation to create the distinct serpentine cooling channels is provided herein.

Figure 1:
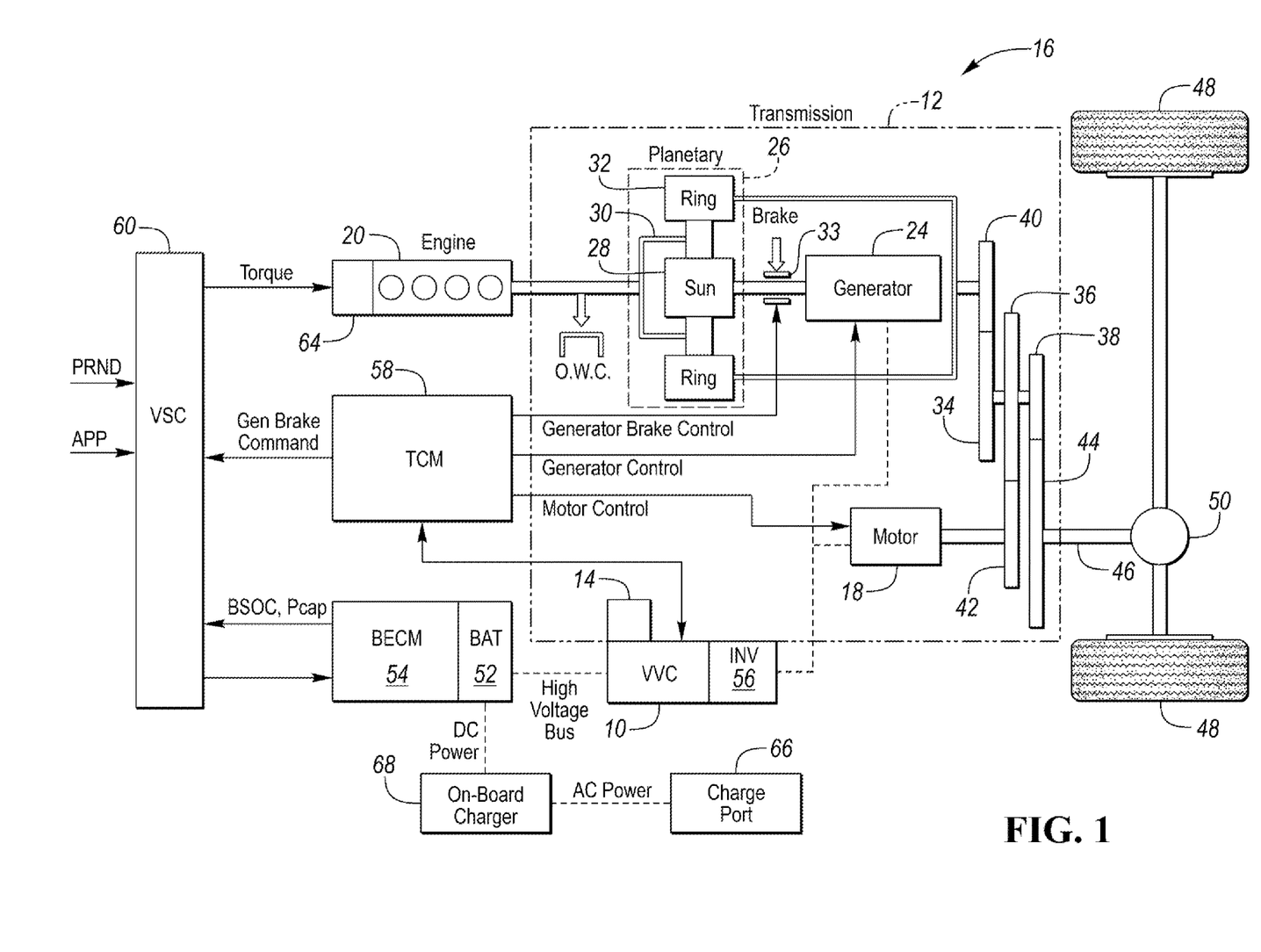
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other designs of the disclosure, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other elements of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to the disclosure. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other designs of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
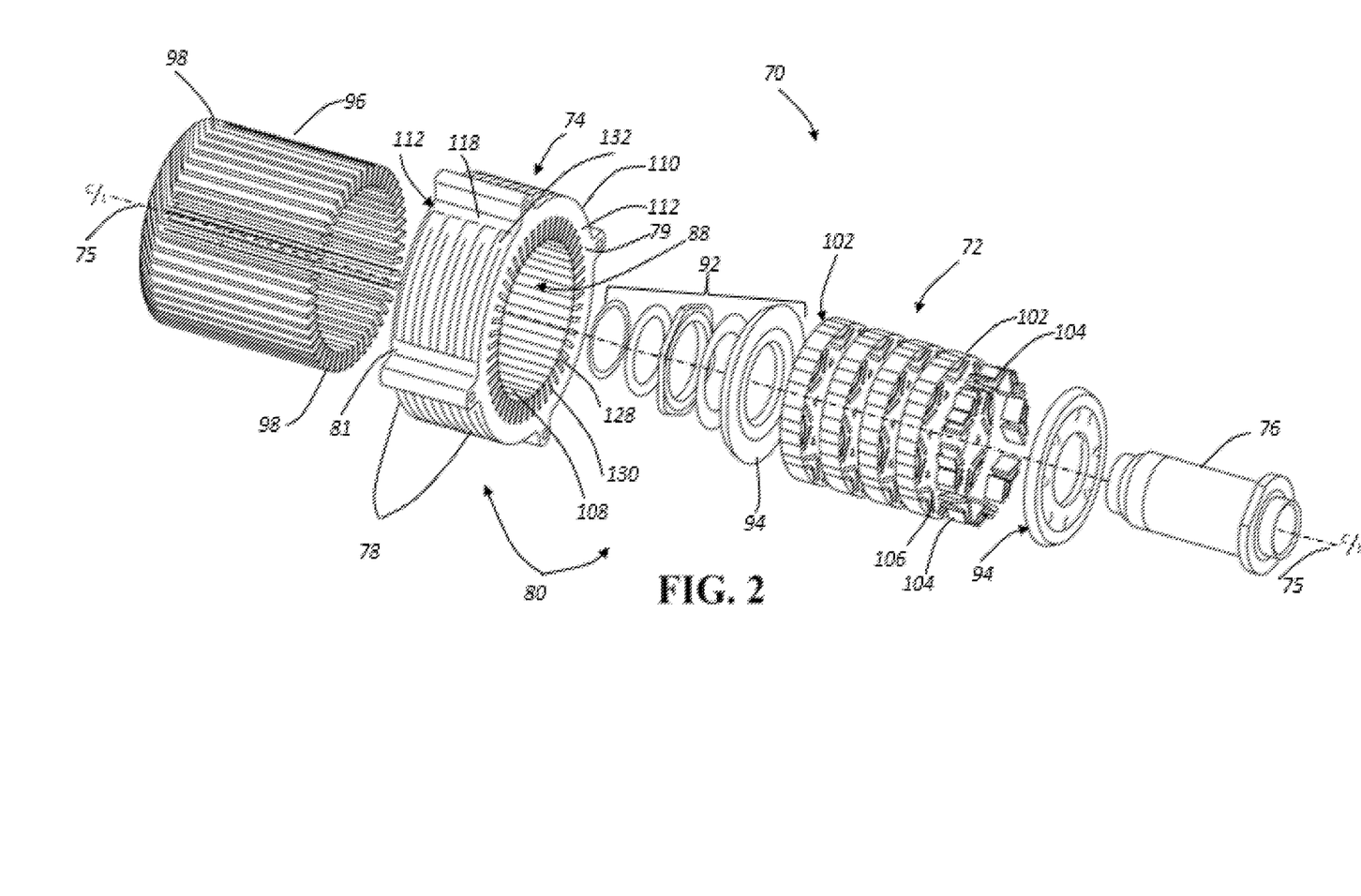
FIG. 2 is a partial exploded view of a portion of an example electric machine.

Referring to FIG. 2, an exploded view of an example electric machine 70 is illustrated, the example electric machine 70 includes a stator 74 having a plurality of laminations 78. The electric machine 70 has a central axis or centerline 75 that extends longitudinally through the electric machine 70. Each of the laminations 78 includes a front side and a back side. When stacked, the front and back sides are disposed against adjacent front and back sides to form a stator core 80 such that the back side of a first lamination is stacked against the front side of a second lamination as discussed in greater detail below. Each of the laminations 78 may define a hollow center to receive the components of the electric machine 70.

Each lamination 78 includes an inner diameter defining a plurality of teeth 128 extending radially inward toward the inner diameter. Adjacent teeth 128 cooperate to define slots 130. The teeth 128 and the slots 130 of each lamination 78 are aligned with adjacent laminations to define stator slots extending axially through the stator core 80 between opposing end faces 112. The end faces 112 define the opposing ends of the core 80 and are formed by the first and last laminations 79, 81 of the stator core 80. The laminations 78 are interchangeable and are merely labeled as first 79 and last 81 for illustration purposes. A plurality of windings (also known as coils, wires, or conductors) 96 are wrapped around the stator core 80 and are disposed within the stator slots 130. The windings 96 may be disposed in an insulating material (not shown). Portions of the windings 96 generally extend in an axial direction along the stator slots 130. At the end faces 112 of the stator core, the windings 96 bend to extend circumferentially around the end faces 112 of the stator core 80 forming the end windings 98. While shown as having distributed windings, the windings could also be of the concentrated type.

A rotor 72 is disposed within the cavity 88 of the stator 74 and may include at least one mounting tab 85, the mounting tab 85 is illustrated as a plurality of mounting tabs positioned in a quadrant of the lamination stacks. The rotor 72 is fixed to a shaft 76 that is operably connected to the gear box 160 and may include a fastening system 92 having washers, retaining rings or locknuts to secure the rotor 72 to the shaft 76. Additionally, the rotor 72 may also include endplates 94 positioned on the outer ends 102 of the rotor 72, the endplates 94 may be used to secure at least one rotor magnet 104 within magnet cavities 106 positioned in the rotor 72. When current is supplied to the stator 74, a magnetic field is created causing the rotor 72 to spin within the stator 74 generating a torque that is supplied to the gear box 160 via one or more shafts or gears, or the like (not illustrated). The electric machine may also act as generator by mechanically rotating the rotor 72 to generate electricity.

The stator core 80 includes an inner diameter 108 and an outer diameter 110 that are each concentric with the centerline 75 of the stator core 80. The stator 74 is received within a housing, not illustrated. The housing may be cylindrical to match the shape of the stator and may include an inner circumferential surface that may be disposed tightly against the outer diameter 110 of the stator core 80 and an outer circumferential surface 118 further directing a fluid or coolant to flow through a serpentine cooling path 132, discussed in greater detail below.

The electric motor 70 may be cooled by circulating the fluid through and/or around the stator core 80. This may be in addition to any spray cooling (optional). The fluid may be any dielectric fluid such as oil, e.g., automatic transmission fluid. The following figures and text describe one or more example thermal management systems for the electric machine 70.

Figure 3:
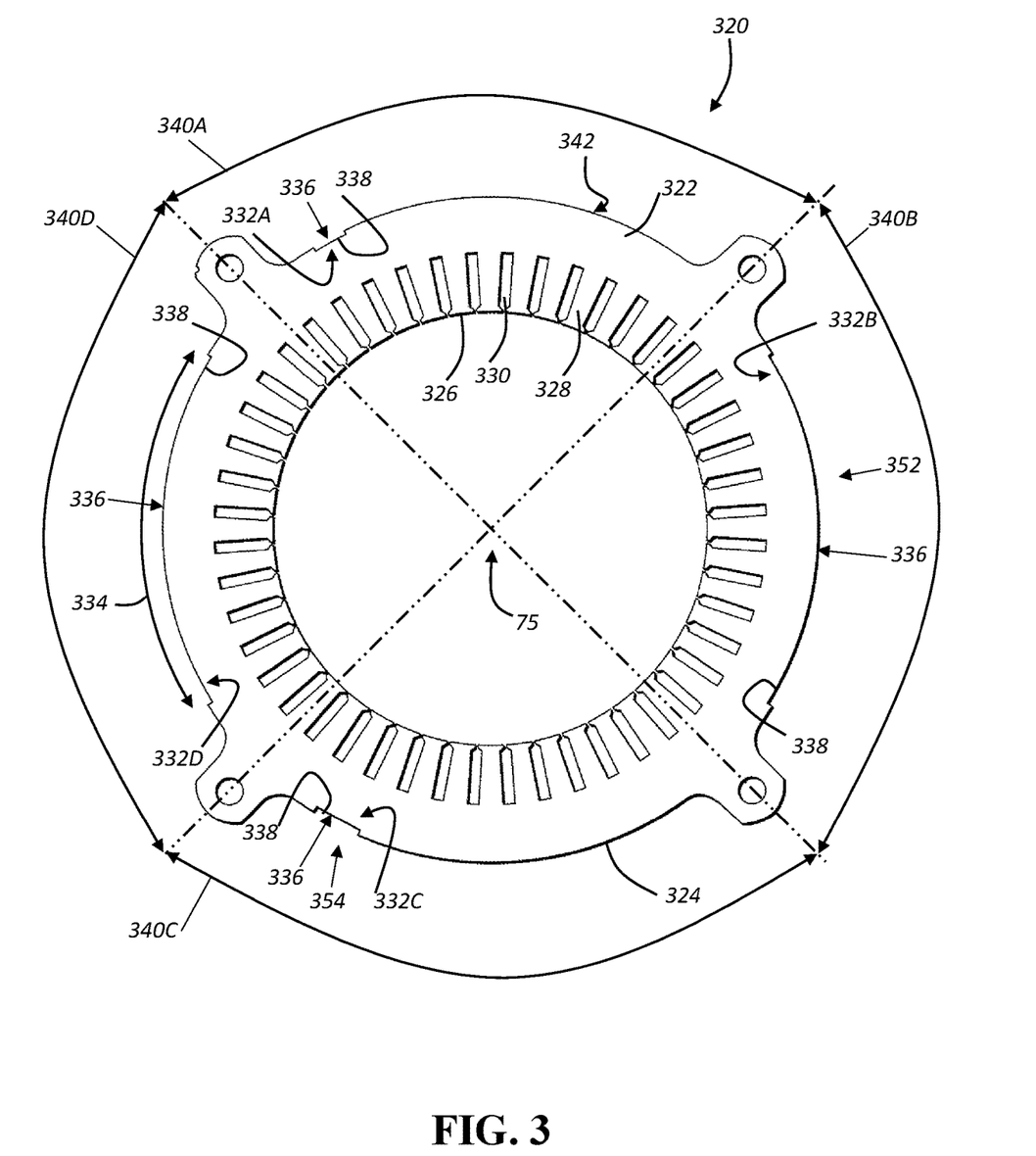
FIG. 3 is a view of a stator lamination along a central axis according to one or more elements of this disclosure.

Referring to FIG. 3, an example lamination plate 320 includes a front face 322 and a rear face 342 and an outer circumferential edge or surface (outer diameter) 324. An inner diameter 326 of the lamination 320 defines teeth 328, that when stacked with other laminations, defines the stator slots 330 for receiving the windings 96. The lamination 320 defines one or more cutouts 332A, 332B, 332C, 332D, collectively referred to as 332, located near or adjacent the outer diameter 324. Each cutout 332 extends through a thickness of the lamination 320, which is defined between the opposing faces 322/342. As illustrated, cutouts 332 are profile areas where the lamination material is removed from the outer diameter 324 between the front first face 322 and the rear second face 342 while extending radially inward at a predetermined radial depth 336 towards the centerline 75 and inwardly from the outer diameter 324. When a plurality of lamination plates 320 are stacked together in a predetermined orientation these cutouts 332 create a channel or groove for the cooling fluid to flow across the outer stator surface, which will be discussed in greater detail below. Each cutout 332 has a circumferential distance 334 extending around a predetermined distance on the outer surface 324 and thickness between the opposing faces 322 and 342 and a radial depth 336 that is measured from the outer diameter 324 to an inner circumferential surface, generally identified at 338, which forms the base of the cutout 332.

The example lamination 320 may be divided into sections or quadrants 340A, 340B, 340C and 340D, collectively referred to as the quadrant 340 and/or quadrants 340, each quadrant includes the cutout 332. As illustrated, cutout 332A corresponds with quadrant 340A, cutout 332B corresponds with quadrant 340B, cutout 332C corresponds with quadrant 340C, and cutout 332D corresponds with quadrant 340D, which individually form a plurality of cooling paths a single cooling path in each quadrant 340. It is understood that the circumferential distance 334 may vary between quadrants 340 however, opposing quadrants or the quadrants directly across from one another will have substantially similar circumferential distances 334 for the opposing cutouts 332. More specifically, cutout 332A will align with 332C if the lamination plate 320 were folded in half with the quadrant 340A overlaid on quadrant 340C. The same would be true if quadrant 340B were folded onto quadrant 340D the left side and right sides were folded on top of each other the cutout 332B would overlay and align with cutout 332D. Thus, cutout 332A positioned in quadrant 340A is opposite and has the same circumferential distance 334 as the opposing cutout 332C positioned in quadrant 340C. Alternatively, cutout 332B in quadrant 340B, is opposite and has the substantially same circumferential distance 334 as cutout 332D in quadrant 340D. Thus, the cutouts 332 are a mirror image for each opposing quadrant 340 and in an asymmetric configuration which is the same for each lamination plate 320.

The radial depth 336 may be increased or decreased based on the cooling needs of the electric machine 70. The cutouts 332 are illustrated as two distinct sizes, a large cutout 352 (cutouts 332B and 332D) that extends over half of the radius of the quadrants 340B and 340D, respectively and a small cutout 354 (cutouts 332A and 332C) that extends a distance less than the large cutout 352 and is positioned in the quadrants 340A and 340C. The radial length of the large cutout 352 and the small cutout 354 is predetermined by the cooling needs of the electric machine and may be adjusted accordingly during the manufacturing process. The radial depth 336 may typically be the same, but in some instances the depths may be greater as determined by the predetermined cooling need and flow needs of the electric machine. The laminations may be formed of metal or metal alloy and maybe fabricated by stamping. The stamping process may start with a donut-shaped blank that is stamped in a single process to have all of the various openings, teeth, cutouts, etc. The plurality of same laminations may then be stacked and permanently joined together the form a stator core.

Figure 4A:
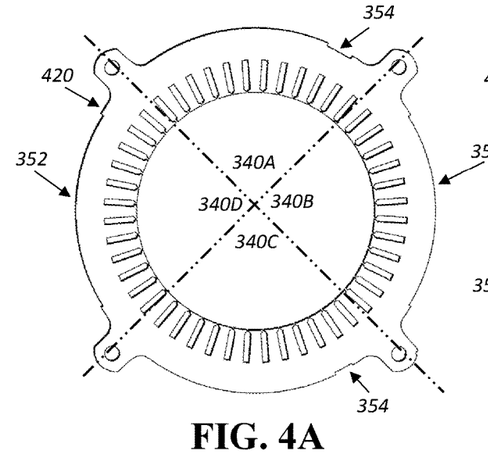
FIG. 4A is a front view of an exemplary stator lamination positioned in a first rotational orientation according to one or more elements of this disclosure.

FIGS. 4A through 4D depict the example lamination plate 320 in various rotated positions where the first face 322 is in the front view and the cutouts 332 are in varying rotational orientations prior to being stacked together. Specifically, FIG. 4A depicts a first orientation 420 where the cutout 332 is the small cutout 354 and is positioned at a top of the illustration on a right side of quadrant 340A and the bottom of the illustration on a right side of quadrant 340C while the large cutout 352 is positioned in quadrants 340B and 340D, respectively.

Figure 4B:
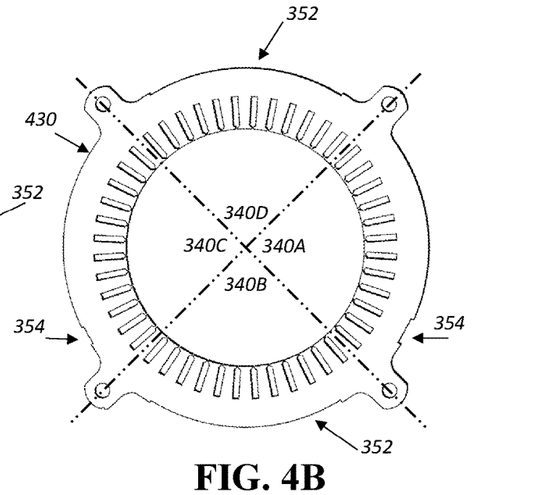
FIG. 4B is a front view of the stator lamination of FIG. 4A positioned in a second rotational orientation rotated 90 degrees according to one or more elements of this disclosure.

FIG. 4B depicts a second orientation 430 where the lamination plate 320 is rotated clockwise 90 degrees from the position in FIG. 4A illustrating the large cutout 352 positioned at the top of the lamination plate 320 in quadrant 340D and in the bottom of the illustration in quadrant 340B while the small cutout 354 has moved toward the bottom of quadrants 340A and 340C, respectively.

Figure 4C:
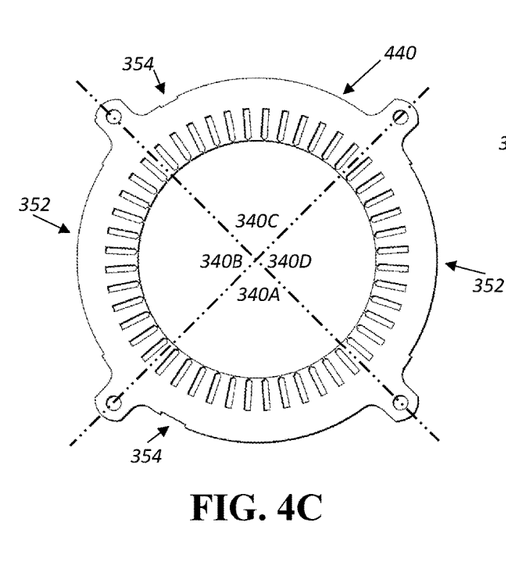
FIG. 4C is a front view of the stator lamination of FIG. 4A positioned in a third rotational orientation rotated 180 degrees according to one or more elements of this disclosure.

FIG. 4C depicts a third orientation 440 where lamination plate 320 is rotated clockwise 180 degrees from the position in FIG. 4A illustrating the small cutout 354 positioned at a top of the illustration on the left side of quadrant 340C and the bottom of the illustration on the left side of quadrant 340A while the large cutout 352 is positioned in quadrants 340B and 340D, respectively.

Figure 4D:
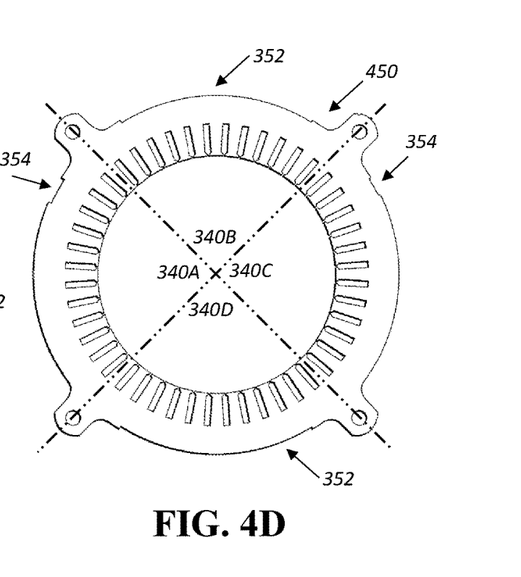
FIG. 4D is a front view of the stator lamination of FIG. 4A positioned in a fourth rotational orientation rotated 270 degrees according to one or more elements of this disclosure.

FIG. 4D depicts a fourth orientation 450 where the lamination plate 320 is rotated clockwise 270 degrees from the position in FIG. 4A illustrating the large cutout 352 positioned at the top and bottom of the lamination plate 320 in quadrants 340B and 340D while the small cutout 354 is positioned at the top of quadrants 340A and 340C, respectively. The four orientations 420, 430, 440 and 450 define the order in which a plurality of lamination plates 320 may be assembled. Specifically, the lamination plates 420, 430, 440 and 450 may be assembled sequentially with the rear face 342 of the first lamination plate 320A positioned adjacent the front face 322 of the second lamination plate 320B, then the front face 322 of the third lamination plate 320C will be positioned adjacent the rear face 342 of lamination plate 320B, and finally the front face 322 of lamination plate 320D will be positioned adjacent the rear face 342 of lamination plate 320C to create a contiguous stacked lamination set or sub-stack where the lamination plates are stacked between the front face of 320A and the rear face of 320D, which will be discussed in greater detail below. It should be understood that any number of lamination plates may be used and merely for illustration purposes four lamination plates have been stacked together into the lamination stack with five lamination stacks being illustrated to make up the stator core 80.

Figure 5:
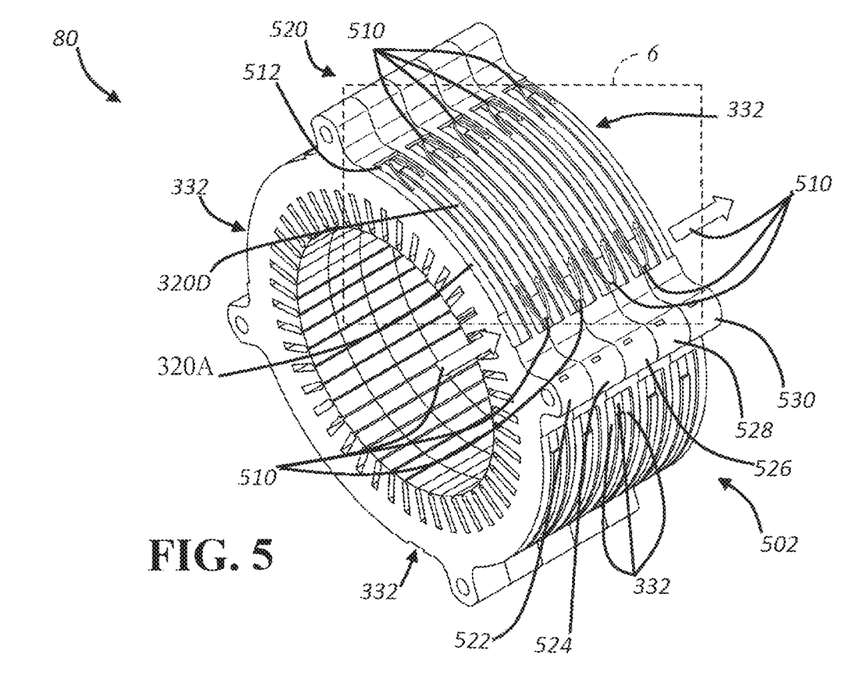
FIG. 5 is a perspective view of the stator core illustrating a serpentine cooling path according to one elements of this disclosure.

FIG. 5 illustrates the exemplary stator core 80 formed of a plurality of laminations 320 arranged contiguously in a linear stack 502 aligning the cutouts 332, as discussed above and forming a continuous serpentine flow path or cooling channel 510 on an outer surface 512 of at least one quadrant 340 of the stator core 80. As illustrated, each cooling channel 510 begins at the first lamination plate 320A and terminates at the last lamination plate 320D traversing an axial length of the stator core in a serpentine path across a radius of the quadrant 340 the channel 510 is positioned. The number of cooling channels 510 positioned on the outer surface 512 corresponds to the individual quadrants 340A, 340B, 340C and 340D of the stator core 80. Thus, there are four distinct cooling channels 510, one configured in each quadrant, which do not intermix with the other quadrants 340.

In this example, the linear stack 502 includes a plurality of sub-stacks 522, 524, 526, 528, and 530 (collectively identified as sub-stack 520) stacked contiguously to form the stator core 80, while each sub-stack may include a single lamination plate or a plurality of lamination plates. The example stator core 80 depicts each sub-stack 520 including four lamination plates 320A, 320B, 320C and 320D. Each linear stack 502 may include at least four sub-stacks 520 and the illustrated stator core in FIG. 5 and FIG. 6 includes five sub-stacks 520. These five sub-stacks 520 include the continuous serpentine cooling channel 510 formed directly by the laminations 320 configured in the orientations 420, 430, 440 and 450, discussed above, each cutout thereby forming the fluid path and working in conjunction with the housing placing cooling fluid over the outer surface 512 and in direct contact with the stator core 80 resulting in efficient transfer of thermal energy.

Figure 6:
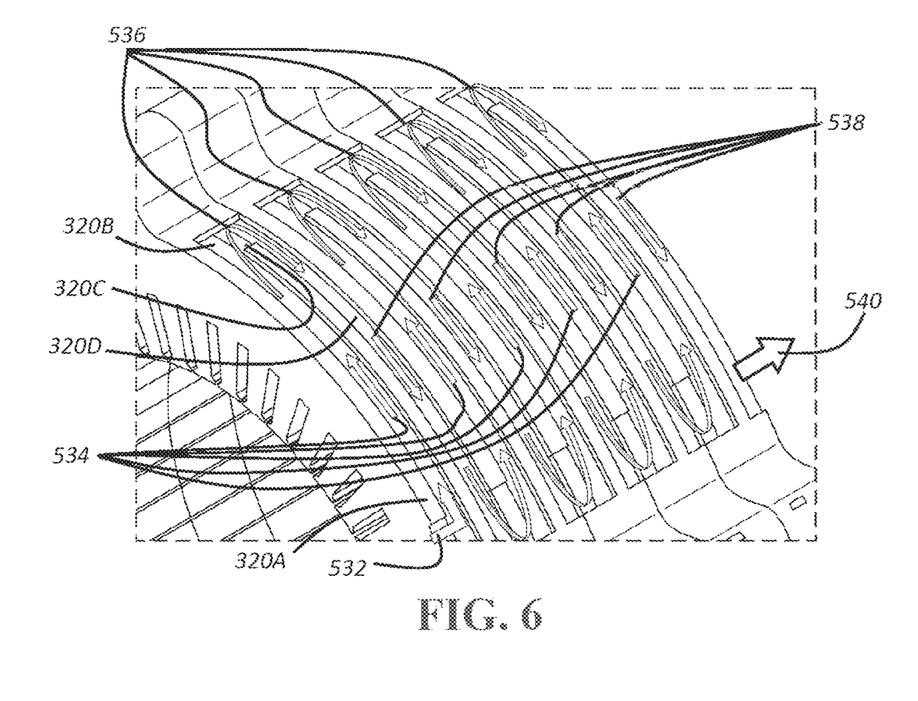
FIG. 6 is a detailed perspective view of the serpentine cooling path of FIG. 5.

FIG. 6 illustrates a detailed view the cooling channel 510 of FIG. 5. The cooling channel 510 is directly formed by the laminations 320 stacked together and aligning the large 352 and small 354 cutouts 332A, 332B, 332C and 332D in the staggered rotation, as discussed above at least in FIGS. 4A-4D, resulting in the cooling channel 510, which flows in a single continuous serpentine path illustrated using arrows. As the arrows illustrate, the fluid enters the first lamination plate 320A flowing in a first axial direction 532 at the small cutout 354 and flows in first circumferential direction 534 along the second lamination plate 320B at the large cutout 352, then the fluid reverses direction flowing axially across the small cutout 354 of the third lamination plate 320C in a second axial direction 536 then flowing in a second circumferential direction 538 along the large cutout 354 of the fourth lamination plate 320D completing the flow through the first sub-stack 522. Then the flow path repeats through the same serpentine path through each consecutive sub-stacks 524, 526, 528 and 530, all having the same layout of lamination plates 320 as described above. It should be understood that the flow path is continuous and repeats the entrance of flowing in the first axial direction 532 for each sub-stack 520 cooling channel 510 to finally exit at the last lamination and out the exit 540 and into housing as described above. The serpentine configuration total length is dependent on how many sub-stacks 520 are included in the stator core assembly, as illustrated there are five sub-stacks 520, but any number may be included depending on the size of the electric machine. Additionally, as illustrated, the four quadrants 340A, 340B, 340C and 340D all include separate serpentine cooling channels 520 however, it should be understood that the sub-stacks and stator core may be divided into other configurations such as halves, thirds or any number of circumferential layouts providing any number of flow paths and is merely illustrated as fourths for ease of disclosure. The mounting tabs may also be removed or replaced with other known forms of mounting as desired for specific electric machines.

Figure 7:
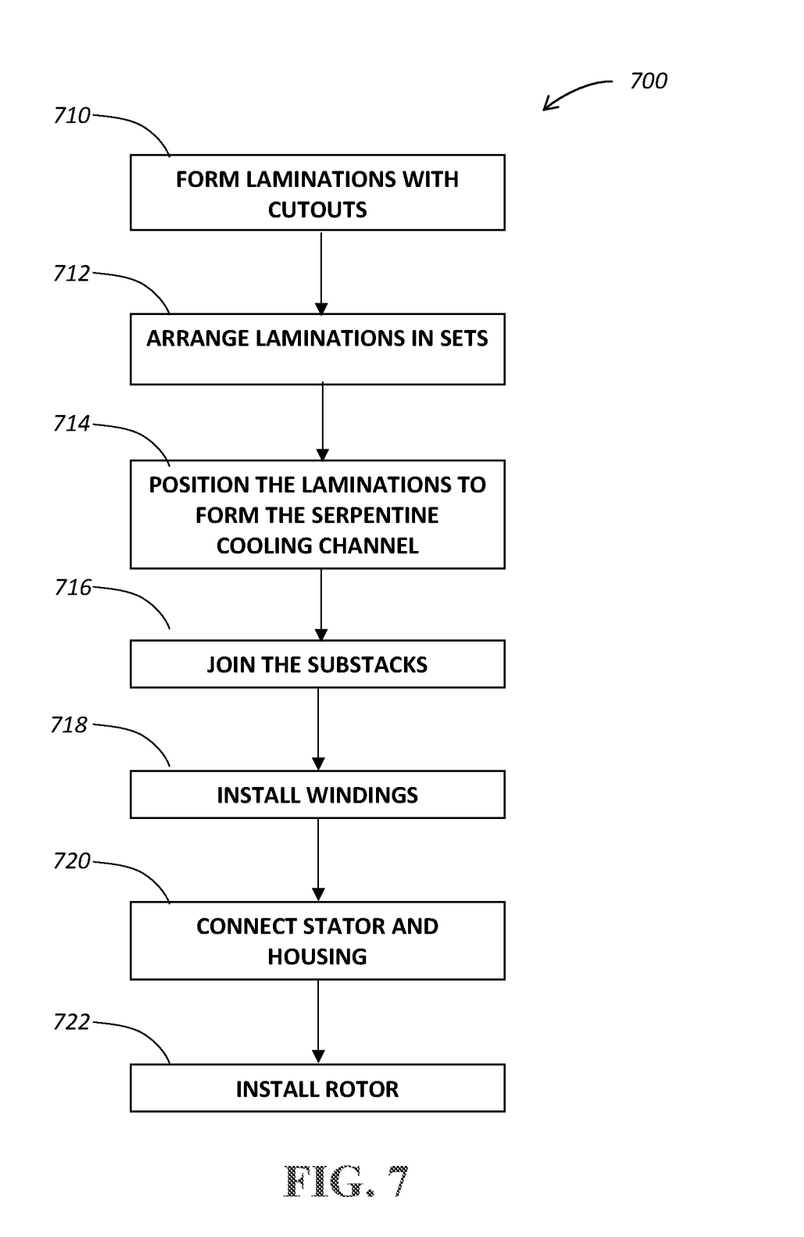
FIG. 7 is a flow diagram for a method of manufacture of a stator assembly according to one or more elements of this disclosure.

FIG. 7 illustrates a method 700 of assembling an electric machine having serpentine cooling paths as described above. At step 710, laminations are divided into sections and formed with the cutouts as described above. The cutouts may be large cutouts or small cutouts and the sections may be thirds, halves, quadrants or other circumferential divisions. At step 712, the laminations are arranged in sets that include one or more lamination. The laminations are rotated and stacked at step 714 to position the cutouts and align the cooling channel into a continuous serpentine flow path by rotating each lamination relative to the other by a predetermined amount as described above. At step 716, the laminations are joined to each other to form a solid stator core. The windings are installed at operation 718. At operation 720, the stator is installed in the housing with the outer diameter tightly against the inner diameter of the housing to fully enclose the serpentine cooling paths. The rotor is installed within the stator at operation 722.

The words used in the specification are words of description rather than limitation, and it is understood that various changes may be made without departing from the spirit and scope of the disclosure. As previously described, the features of various elements may be combined to form further elements of the disclosure that may not be explicitly described or illustrated. While various elements could have been described as providing advantages or being preferred over other designs or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, elements described as less desirable than other elements or prior art implementations with respect to one or more characteristics are not outside the scope of the disclosure and may be desirable for particular applications.

While exemplary elements are described above, it is not intended that these elements describe all possible forms of the disclosure. Rather, the words used in the specification are words of description rather than limitation, and it is understood that various changes may be made without departing from the spirit and scope of the disclosure. Additionally, the features of various implementations may be combined to form further elements of the disclosure.

What is claimed is:

1. An electric machine for an electrified vehicle comprising:
    a stator core including a plurality of sub-stack laminations each including a plurality of individual lamination plates and having an outer diameter surface including four circumferential quadrants, each of the quadrants having a cutout defining a serpentine cooling channel, two of the quadrants having a first cutout orientation, the two other quadrants having a second cutout orientation different than the first cutout orientation, each of the lamination plates having an asymmetric cutout configuration which is same for each of the lamination plates, and each of the sub-stack laminations being rotated at least 90 degrees about a centerline of the stator core relative to each of the other sub-stack laminations such that each of the asymmetric cutouts is aligned in each of the quadrants at each 90 degree rotation; and
    at least one winding supported on the stator core.

2. The electric machine of claim 1, wherein each of the asymmetric cutouts is aligned in each of the quadrants to form a continuous cooling path such that there are four individual continuous cooling paths defined in each of the quadrants.

3. The electric machine of claim 1, wherein the stator core includes at least four sub-stack laminations and the serpentine cooling channel extends continuously across each of the sub-stack laminations in each of the quadrants thereby forming four distinct cooling channels on the outer diameter surface.

4. The electric machine of claim 1, further comprising at least one mounting tab configured between at least two of the quadrants.

5. The electric machine of claim 1, further comprising at least four mounting tabs, each of the mounting tabs positioned between the quadrants.

6. The electric machine of claim 1, further comprising a housing defining an inner circumferential surface, wherein the stator core is disposed within the housing such that the cooling channels cooperate with the inner circumferential surface of the housing to define a serpentine cooling path.

7. The electric machine of claim 1, further comprising a rotor supported for rotation within the stator.

8. An electric machine for an electrified vehicle comprising:
    a stator core including a plurality of sub-stack laminations each including a plurality of individual lamination plates and having an outer diameter surface including four circumferential quadrants, each of the quadrants having a cutout defining a serpentine cooling channel, some of the quadrants having a first cutout orientation, the other quadrants having a second cutout orientation different than the first cutout orientation, each of the lamination plates having an asymmetric cutout configuration, and each of the sub-stack laminations being rotated at least 90 degrees about a centerline of the stator core relative to each of the other sub-stack laminations such that each of the asymmetric cutouts is aligned in each of the quadrants at each 90 degree rotation; and at least one winding supported on the stator core.

9. The electric machine of claim 8, wherein each of the asymmetric cutouts is aligned in each of the quadrants to form a continuous cooling path such that there are four individual continuous cooling paths defined in each of the quadrants.

10. The electric machine of claim 8, wherein the stator core includes at least four sub-stack laminations and the serpentine cooling channel extends continuously across each of the sub-stack laminations in each of the quadrants thereby forming four distinct cooling channels on the outer diameter surface.

11. The electric machine of claim 8, further comprising at least one mounting tab configured between at least two of the quadrants.

12. The electric machine of claim 8, further comprising at least four mounting tabs, each of the mounting tabs positioned between the quadrants.

13. The electric machine of claim 8, further comprising a housing defining an inner circumferential surface, wherein the stator core is disposed within the housing such that the cooling channels cooperate with the inner circumferential surface of the housing to define a serpentine cooling path.

14. The electric machine of claim 8, further comprising a rotor supported for rotation within the stator.

* * * * *